(12) United States Patent
Wojciechowski

(10) Patent No.: US 6,501,620 B1
(45) Date of Patent: Dec. 31, 2002

(54) TAPE GUIDE MECHANISM WHICH ORIENTS TAPE IN TRANSVERSE AND NORMAL-TO-TRANSVERSE DIRECTIONS FOR ADJUSTING TAPE STIFFNESS

(75) Inventor: Matthew P. Wojciechowski, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/519,243

(22) Filed: Mar. 6, 2000

(51) Int. Cl.[7] ............................................. G11B 15/60
(52) U.S. Cl. ................. 360/130.21; 360/95; 226/189; 242/615.1
(58) Field of Search ................. 360/130.21, 130.22, 360/130.23, 83, 85, 93, 95; 242/346.2, 615.1; 226/181, 182, 183, 189

(56) References Cited

U.S. PATENT DOCUMENTS

| | | | | |
|---|---|---|---|---|
| 2,699,332 A | * | 1/1955 | MacKenzie | |
| 3,558,142 A | * | 1/1971 | Poessel | |
| 3,979,773 A | * | 9/1976 | Sawazaki et al. | 360/93 |
| 4,310,863 A | * | 1/1982 | Lelandais | 360/130.21 |
| 4,338,641 A | * | 7/1982 | Sato | 360/130.21 |
| 6,067,213 A | * | 5/2000 | Oldermann et al. | 360/130.21 |

* cited by examiner

Primary Examiner—Craig A. Renner
(74) Attorney, Agent, or Firm—Brooks & Kushman P.C.

(57) ABSTRACT

A guide mechanism and method for positioning a tape media in a transverse position at a transducer. A first surface guide disposed to one side of the transducer engages the tape media surface to orient the tape media surface non-planar with respect to the transverse position. A second surface guide disposed between the first surface guide and transducer engages the tape media surface to orient the tape media surface parallel to the transverse position. An edge guide disposed adjacent to the transducer engages the edge of the tape media positioning the tape media at a predetermined transverse position. A third and fourth surface guides and a second edge guide may be provided on the opposite side of the transducer to permit positioning of the tape media having bidirectional movement.

8 Claims, 3 Drawing Sheets

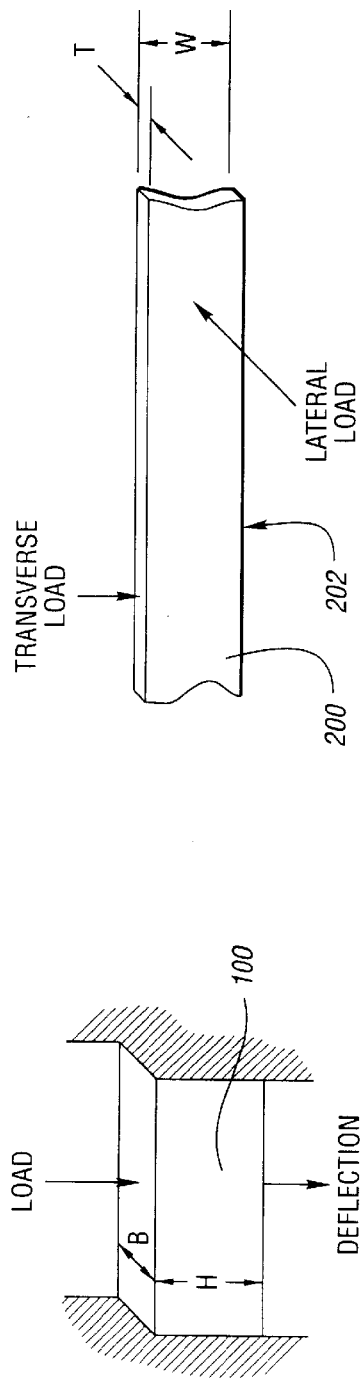
Fig. 1
Fig. 2
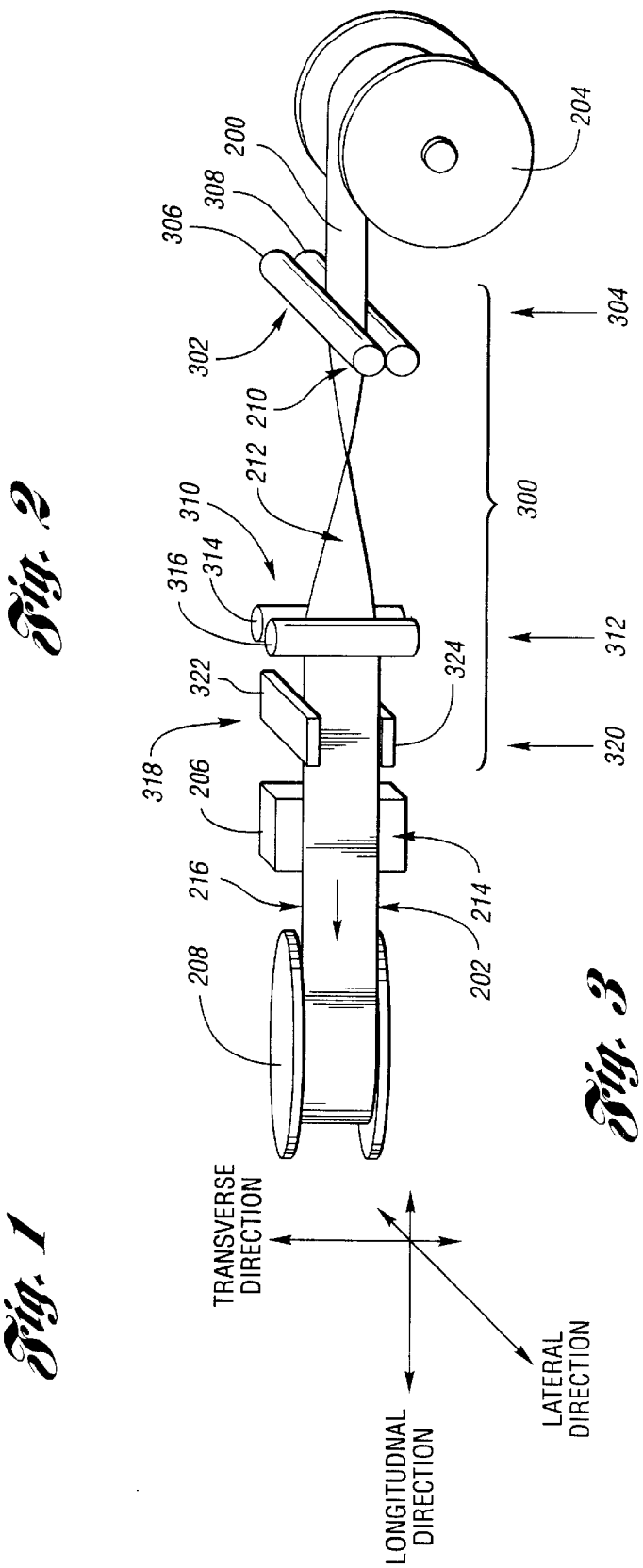
Fig. 3

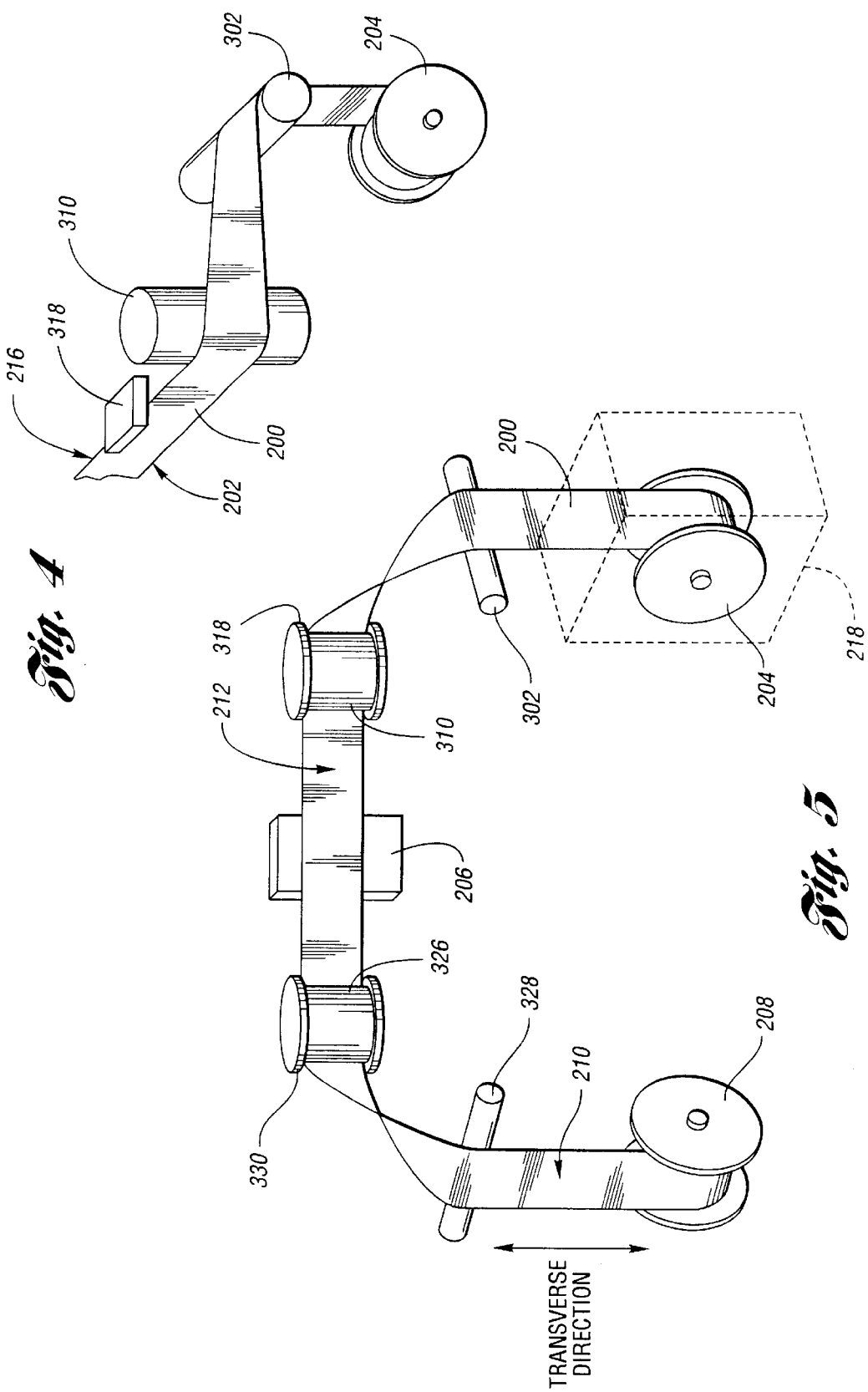

TAPE GUIDE MECHANISM WHICH ORIENTS TAPE IN TRANSVERSE AND NORMAL-TO-TRANSVERSE DIRECTIONS FOR ADJUSTING TAPE STIFFNESS

TECHNICAL FIELD

The present invention relates to the field of guide mechanisms and methods of transversely positioning a tape media across the face of a transducer.

BACKGROUND ART

One method of increasing the density of data stored in a tape media is to reduce the width of data tracks written therein. The narrow data tracks in turn require a tighter tolerance be maintained for the transverse positioning of the tape media with respect to a transducer. A common method for transverse positioning the tape media is to bias either its top edge or the bottom edge against a stationary or rotating reference edge guide. As long as the edge of the tape media does not buckle at the reference edge guide, high tracking accuracies can be maintained between the data tracks on the tape media and the transducer.

Positioning of the tape media in the transverse direction usually requires some transverse bending of the tape media. This bending can introduce stresses and strains in the tape media that reduce its useful life span. Contact between the tape media edges and the referenced guide surfaces causes wear and tear on the tape media edges over prolonged periods. Edge wear and damage can result in increased tracking errors and result in the generation of particulates that can interfere with the read-write process between the tape media and the transducer.

Close mechanical tolerances must be maintained between a tape media storage spool and the tape guides to minimize the transverse bending of the tape media and the force with which the tape media edges contact the storage spool. Tracking errors are especially noticeable where the tape media leaving the storage spool is misaligned with the edge guides that transversely position the media before the transducer. Misalignments can be due to conditions such as stagger wrap and pre-stress in the tape media as it is wrapped around the storage spool. Mechanical misalignment and design tolerance stacking between the storage spool, a cartridge housing surrounding the storage spool, and cartridge mounting hardware holding the cartridge can also play a significant role in creating tracking errors. Other factors include manufacturing defects in the storage spool and cartridge housings, manual handling dynamics of the storage spool and cartridge, robotic handling dynamics of the storage spool and cartridge, shelf-life problems, and environmentally induced creep, shrink and stretch due to temperature, humidity and tension/handling stresses.

DISCLOSURE OF INVENTION

The present invention is a guide mechanism and a method for positioning a tape media in a transverse direction with respect to a transducer as the tape media is moved from a first spool to a second spool. A first surface guide is disposed between the first spool and the transducer. This first surface guide engages at least one of the two surfaces of the tape media to orient the tape media non-planer with respect to the transverse direction. This orientation reduces the tape media stiffness in the transverse direction, making the tape media easier to bend in the transverse direction. A second surface guide is disposed between the transducer and the first surface guide. The second surface guide engages at least one of the two surfaces of tape media to orient the surfaces approximately parallel to the transverse direction. In this orientation, the transverse stiffness of the tape media is at its maximum, and the media-side surface of the tape media is now parallel to the face of the transducer. A first edge guide is disposed adjacent to the transducer. The first edge guide engages at least one of the two edges of the tape media to precisely position the tape media in the transverse direction. The first edge guide may be mounted on, or mounted independent of the second surface guide.

A mirrored set of surface guides and an edge guide may be disposed between the transducer and the second spool to provide highly accurate transverse positioning when the tape media moves from the second spool across the face of the transducer and back to the first spool.

In the preferred embodiment, the first surface guide orients the tape media surfaces into a plane normal to the transverse direction. This requires the first spool's axis of rotation also to rest in a plane normal to the transverse direction. Here, the tape media leaves the first spool and then undergoes a 90° twist between the first surface guide and the second surface guide. The first edge guide provides final transverse positioning of the tape media just before it engages the transducer. Finally, the tape media is wound around the second spool.

A second twist can be introduced in the tape path to allow the first spool, the second spool, and the transducer to remain in a common plane. The second twist is caused by an additional surface guide disposed between the first surface guide and the first spool. This additional surface guide engages at least one of the two tape media surfaces to orient the tape media surfaces approximately parallel to the axis of rotation of the first spool which itself is parallel to the transverse direction.

Accordingly, it is an object of the present invention to provide a guide mechanism for transverse positioning a tape media with respect to a transducer that utilizes the lower lateral stiffness of the tape media, as compared with the transverse stiffness, to allow the tape media to be easily positioned in the transverse direction.

Another object of the present invention is to provide a method of positioning a tape media in a transverse direction with respect to a transducer that utilizes the lower lateral stiffness of the tape media, as compared with the transverse stiffness, to allow the tape media to be easily positioned in the transverse direction.

These and other objects, features, and advantages will be readily apparent upon consideration of the following detailed description in conjunction with the accompanying drawings.

BRIEF DESCRIPTION OF DRAWINGS

FIG. 1 is a perspective view of a beam secured at both ends;

FIG. 2 is a perspective view of a section of tape media;

FIG. 3 is a perspective view of a guide mechanism;

FIG. 4 is a partial perspective view of a second alternative embodiment of the guide mechanism;

FIG. 5 is a perspective view of a third alternative embodiment of the guide mechanism;

BEST MODE FOR CARRYING OUT THE INVENTION

Figure 6:
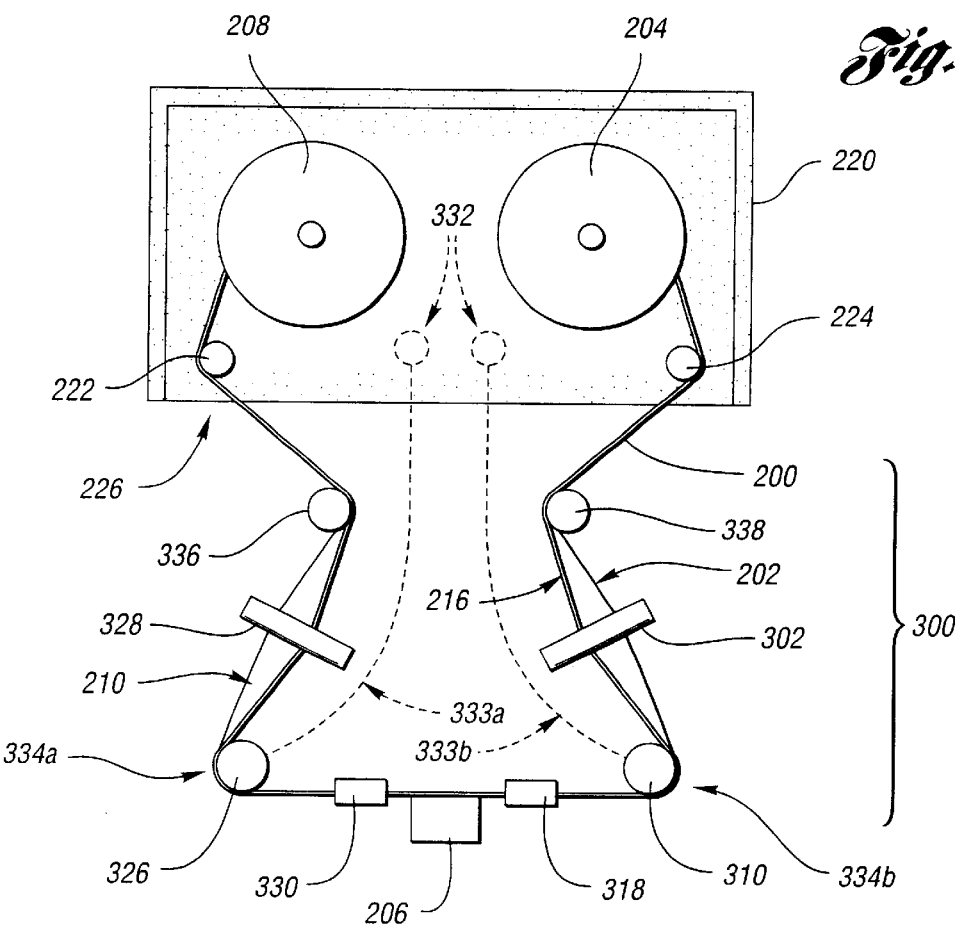
FIG. 6 is a top view of a fourth alternative embodiment of the guide mechanism.

FIG. 1 is a perspective view of a beam 100 secured at both ends. The beam 100 has a cross-sectional height H and a cross-sectional thickness B. A downward load applied to the top of the beam 100 will cause a corresponding downward deflection that is dependent upon the stiffness of the beam material. Material stiffness I is basically related to the second moment of cross-section area or rectangular moment of Inertia as shown in equation 1:

$$I=(B\times H^3)/12 \quad (1)$$

Material stiffness can be measured on a tape media 200 along two orthogonal axes, as shown in FIG. 2. Transverse loading occurs when the load is applied parallel to a width W of the tape media. 200 The transverse load is typically the bias force used to force an edge 202 of the tape media 200 against a reference edge guide. For transverse loading of the tape media 100, the cross-sectional height H of the material is the width W of the tape media 200, and the cross-sectional thickness B of the material is a thickness T of the tape media thickness 200. Tape media 200 may also be loaded in the lateral direction. Lateral loading is typically provided by tape tension that biases the tape media 200 against surface guides. Here, the cross-sectional height H of the material is equal to the thickness T of the tape media 200, and the cross-sectional thickness B is equal to the width H of the tape media 200. A ratio of the transverse stiffness to the lateral stiffness is given In equation 2 as:

$$I_{trans}/I_{lat}=(T\times W^3/12)/(W\times T^3/12)=W^2/T^2 \quad (2)$$

Computing the ratio of transverse stiffness to lateral stiffness for a typical half inch (1.27 centimeters) wide tape media 200 having a 13.5 micrometer thickness, produces a ratio of approximately 885,000 to 1. In other words, the transverse stiffness is about one million times greater than the lateral stiffness of a tape media 200. Consequently, any storage spool related positional errors along the width W of the tape media 200 couple approximately one million times better into tracking errors than any storage spool related positional errors in the direction of the thickness T of the tape media 200.

FIG. 3 is a perspective view of a guide mechanism 300 implementing the present invention. This guide mechanism 300 provides transverse direction positioning of the tape media 200 as the tape media 200 moves from right to left from a first spool 204, past a transducer 206, and to a second spool 208. As the tape media 200 streams out of the first spool 204, it first encounters a first surface guide 302 positioned at a first surface guide location 304. In this embodiment, the first surface guide 302 consists of two guide rollers 306 and 308. Guide rollers 306 and 308 are spaced apart from each other sufficiently to allow the tape media 200 to pass between them. Each guide roller 306 and 308 may be stationary or rotatable. In operation, the first surface guide 302 orients the tape media 200 so that a media-side surface 210 and a backside surface 212 of the tape media 200 are in a plane normal to the transverse direction. The first surface guide 302 also acts to fix the tape media 200 at a predetermined position in the transverse direction, while allowing the tape media 200 freedom to move in the lateral direction.

A second surface guide 310 is positioned at a second surface guide location 312 between the first surface guide 302 and the transducer 206. The second surface guide 310 is similar to the first surface guide 302 but has a different location and a different orientation. Second surface guide 310 includes two guide rollers 314 and 316. Roller guides 314 and 316 may be stationary or rotatable. The two roller guides 314 and 316 are spaced apart from each other sufficiently to allow the tape media 200 to pass between them. In operation, the second surface guide 310 engages the tape media 200 to orient the surfaces 210 and 212 of the tape media 200 parallel to the transverse direction and parallel to a face 214 of the transducer 206. This orientation provides the tape media 200 with its maximum transverse stiffness just prior to engaging the transducer 206. Second surface guide 310 also establishes the lateral position of the tape media 200 while allowing for movement in the transverse direction. The lateral positioning provides for proper engagement between the media-side surface 210 of the tape media 200 with the transducer 206.

A first edge guide 318 is located at a first edge guide location 320 adjacent to the transducer 206 and between the transducer 206 and the second surface guide 310. The first edge guide 318 has two guide surfaces 322 and 324 that engage a top edge 216 and bottom edge 202 of the tape media 200 respectively. Functionally, the first edge guide 318 positions the tape media 200 at a predetermined transverse position while allowing for minor lateral direction movement as the transducer 206 engages and disengages from the tape media 200. The first edge guide 318 may be made from a mechanically rigid or mechanically flexible material. In an alternative embodiment, the first edge guide 318 may be located on the opposite side of the transducer 206 as the second surface guide 310.

The embodiment shown in FIG. 3 uses a first surface guide 302, a second surface guide 310, and a first edge guide 318 that engage both surfaces 210 and 212 and both edges 202 and 216 of the tape media 200 simultaneously. In practice it is only necessary, and even desirable for each of these guides 302, 310 and 318 to engage only one surface 210 and 212, or one edge 202 and 216 of the tape media 200. Less contact results in less wear and tear on the tape media 200 and guides 302, 310 and 318.

FIG. 4 is a second embodiment of the guide mechanism 300. In this embodiment, the path of the tape media 200 partially curves around the first surface guide 302 and the second surface guide 310. A tension applied to the tape media 200, combined with the curved path, acts to hold the tape media 200 in contact with the first and second surface guides 302 and 310. Likewise, the first edge guide 318 need only engage one of the two edges 202 and 216 of the tape media 200. This is particularly important because the width of the tape media 200 will vary from location to location on any one tape media 200, over time as the edges 202 and 216 wear, and from vendor to vendor of an industrial standard type tape media 200. By engaging only one edge 202 or 216, the first edge guide 318 will not compress tape media 200 at the wide end of the width tolerance, nor intermittently lose contact with one edge 202 or 216 of a tape media 200 at the narrow end of the width tolerance.

The top edge 216 of the tape media 200 can be biased against the first edge guide 318 by controlling the transverse position of the first surface guide 302. Using FIG. 4 as an example, upward movement of the first surface guide 302 in the transverse direction causes the tape media 200 to move upward on the second surface guide 310 and engage the first edge guide 318. Conversely, downward movement of the first surface guide 302 in the transverse direction causes the tape media 200 to move downward across the second surface guide 310 and pull away from the first edge guide 318. Other approaches may be used to bias the tape media 200 against the first edge guide 318 within the scope of the present invention. For example, the second surface guide 310 may be tapered to bias the tape media 200 toward the first edge guide 318. In another example, a second edge guide (not shown) engaging the bottom edge 202 of the tape media 200 at a location away from the first edge guide 318 may force the tape media 200 upward to engage the first edge guide 318. Referring back to FIG. 3, in yet another example, the bottom guide surface 324 may be made of a resilient or flexible material that biases the tape media 202 upward toward a rigid top guide surface 322.

FIG. 3 and FIG. 4 show embodiments of the guide mechanism 300 where transverse positioning best accommodates the tape media 200 moving in one direction from the first spool 204 and the second spool 208. Most modern tape drives, however, operate with the tape media 200 capable of moving bidirectionally. To accurately transverse position the tape media 200 as it moves from the second spool 208 back to the first spool 204, the first surface guide 302, second surface guide 310, and the first edge guide 318 may be mirrored on the opposite side of the transducer 206. This will result in a third surface guide (not shown) mounted at a third surface guide location between the transducer 206 and the second spool 208, a fourth surface guide (not shown) mounted at a fourth surface guide location between the third surface guide and the second spool 208, and a second edge guide (not shown) mounted at a second edge guide location adjacent to the transducer 206 on the second spool side of the transducer 206.

FIG. 5 shows a third alternative embodiment of the guide mechanism 300 adapted for bidirectional motion of the tape media 200. Here, the second surface guide 310 and third surface guide 326 are disposed on either side of the transducer 206 to transversely position the tape media 200 as it passes across the transducer 206 moving in either direction. The first surface guide 302 is disposed between the second surface guide 310 and the first spool 204 to cause the surfaces 210 and 212 of the tape media 200 to orient into a plane normal to the transverse direction. Likewise, a fourth surface guide 328 is disposed between the second spool 208 and the third surface guide 326 to twist the tape media 200.

FIG. 5 also shows an alternative arrangement of the first edge guide 318 and a second edge guide 330. Instead of mounting the first edge guide 318 independently of the second surface guide 310, as shown in FIG. 3, the first edge guide 318 is mounted on the second surface guide 310. On the other side of the transducer 206, the second edge guide 330 is mounted on the third surface guide 326. In the preferred embodiment, the second surface guide 310 and the third surface guide 326 are rotatable roller guides, while the first edge guide 318 and the second edge guide 330 are flanges on the respective roller guides.

The third guide mechanism embodiment shown in FIG. 5 is well-suited for use with tape media 200 stored in single spool cartridges. For example, the first spool 204 in FIG. 5 is shown disposed inside a cartridge housing 218 (shown in phantom). In this case, the second spool 208 is a permanent part of a tape drive (not shown) in which the guide mechanism 300 is installed.

The present invention can also be adapted for use with dual-spool cartridges, as shown in FIG. 6. Here, the first spool 204 and the second spool 208 both reside inside cartridge housing 220 and are co-planer with each other. Two guide rollers 222 and 224 are also provided in the cartridge housing 220 to position the tape media 200 before an opening 226 in the cartridge housing 220 while the tape media 200 is unthreaded from the guide mechanism 300.

The second surface guide 310 and third surface guide 326 are moveable to pull the tape media 200 from the cartridge housing 220 and engage it with the transducer 206. When the cartridge housing 220 is loaded into the tape drive (not shown), the second surface guide 310 and third surface guide 326 reside at a loading position 332 (shown in phantom). While at the loading position 332, the second surface guide 310 and third surface guide 326 protrude into the cartridge housing 220 between the first spool 204 and the second spool 208. The second surface guide 310 and third surface guide 326 are then moved along paths 333a–b (shown dashed) from their loading positions 332 to their operational positions 334a–b to thread the tape media 200.

As the tape media 200 is pulled from the cartridge housing 220, it first engages a fifth surface guide 336 and a sixth surface guide 338. The fifth surface guide 336 is mounted at a fifth surface guide location between the fourth surface guide 328 and the second spool 208. The sixth surface guide 338 is mounted at a sixth surface guide location between the first surface guide 302 and the first spool 204. In operation, the sixth surface guide 338 and fifth surface guide 336 engage the media-side surface 210 of the tape media 200 and orient the media-side surface 210 parallel to the transverse direction. This provides the proper orientation for the tape media 200 as it arrives and departs from the first spool 204 and second spool 208.

As the second surface guide 310 and third surface guide 326 approach their operational positions 334a–b, the tape media 200 also engages the first surface guide 302 and fourth surface guide 328. First surface guide 302 and fourth surface guide 328 engage the tape media 200 to orient the tape media 200 surface 210 non-planer to the transverse direction. The resulting twists in the tape media 200 make it easier for the first edge guide 318 and second edge guide 326 to transversely position the tape media 200 at the transducer 206. The twists also make it easier for the sixth surface guide 338 and fifth surface guide 336 to transversely position the tape media 200 into alignment with the first spool 204 and second spool 208 respectively. This helps reduce wear and tear on the edges 202 and 216 of the tape media 200 as they rub against the first spool 204 and second spool 208 due to transverse misalignments.

Figure 7:
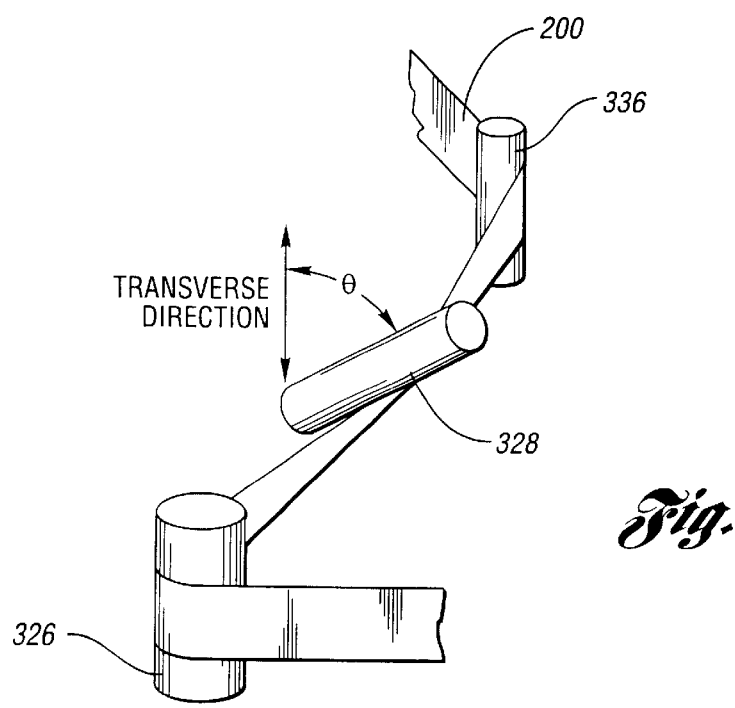
FIG. 7 is a partial perspective view of the fourth alternative embodiment of the guide mechanism.

Using the simple motion of the second surface guide 310 and third surface guide 326 to thread the tape media 200, it is difficult for the first surface guide 302 and fourth surface guide 328 to cause a 90° twist in the tape media 200. To overcome this difficulty, the first surface guide 302 and fourth surface guide 328 may be mounted at angles other than 90° from the transverse direction, as shown in FIG. 7. A tradeoff may be made between the transverse stiffness of the tape media 200 at the first surface guide location and fourth surface guide location, and the design complexity of the guide mechanism 300. For example, the first surface guide 302 and fourth surface guide 328 may be mounted at a 45° angle with respect to the transverse position, as indicated by angle θ for the fourth surface guide 328. As the tape media 200 is brought under tension, it is drawn up against the first surface guide 302 and fourth surface guide 328 causing it to twist.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A guide mechanism for positioning a tape in a transverse direction at a transducer, wherein the tape has two surfaces that are parallel to each other and two edges that are parallel to each other, and the tape extends between a first spool and a second spool, the guide mechanism comprising:

a first surface guide disposed between the first spool and the transducer, the first surface guide being engageable with at least one surface of the two surfaces of the tape to orient the two surfaces of the tape normal with respect to the transverse direction at the first surface guide in order to minimize tape stiffness in the transverse direction and enable the tape to move laterally to position the tape in the transverse direction, wherein the first surface guide fixes the tape in the transverse direction while allowing the tape to move laterally;

a second surface guide disposed between the transducer and the first surface guide, the second surface guide being engageable with at least one surface of the two surfaces of the tape to orient the two surfaces of the tape parallel to the transverse direction at the second surface guide in order to maximize tape stiffness in the transverse direction prior to the tape meeting the transducer, wherein the second surface guide fixes the tape laterally while allowing the tape to move in the transverse direction;

a first edge guide disposed between the second surface guide and the transducer, the first edge guide being engageable with at least one edge of the two edges of the tape to secure a predetermined transverse position of the tape relative to the transducer;

a second edge guide disposed adjacent to the transducer on an opposite side of the transducer as the first edge guide, the second edge guide being engageable with at least one edge of the two edges of the tape to secure the predetermined transverse position of the tape relative to the transducer;

a third surface guide disposed between the transducer and the second spool, the third surface guide being adapted to engage at least one surface of the two surfaces of the tape to orient the two surfaces of the tape approximately parallel to the transverse direction; and a fourth surface guide disposed between the third surface guide and the second spool, the fourth surface guide being adapted to engage at least one surface of the two surfaces of the tape to orient the two surfaces of the tape non-planar with respect to the transverse direction.

2. The guide mechanism of claim 1 wherein the first edge guide is disposed on the second surface guide.

3. The guide mechanism of claim 2 wherein the second surface guide is a roller, and the first edge guide is a flange on the roller.

4. The guide mechanism of claim 1 wherein the fourth surface guide is adapted to orient the two surfaces of the tape approximately normal with respect to the transverse direction.

5. The guide mechanism of claim 1 wherein the second spool has an axis of rotation, the guide mechanism further comprising a fifth surface guide disposed between the fourth surface guide and the second spool, the fifth surface guide being engageable with at least one surface of the two surfaces of the tape to orient the two surfaces of the tape approximately parallel to the axis of rotation of the second spool.

6. The guide mechanism of claim 1 wherein the first spool has an axis of rotation, the guide mechanism further comprising a sixth surface guide disposed between the first surface guide and the first spool, the sixth surface guide being engageable with at least one surface of the two surfaces of the tape to orient the two surfaces of the tape approximately parallel to the axis of rotation of the first spool.

7. The guide mechanism of claim 1 wherein the second edge guide is disposed on the third surface guide.

8. The guide mechanism of claim 7 wherein the third surface guide is a second roller, and the second edge guide is a second flange on the second roller.

* * * * *